United States Patent [19]

McLennan et al.

[11] Patent Number: 5,169,177
[45] Date of Patent: Dec. 8, 1992

[54] QUICK CONNECT BRANCH CONNECTOR

[75] Inventors: William R. McLennan, Easton, Pa.; Robert Rung, Hopatcong; Douglas R. Dole, Whitehouse Station, both of N.J.

[73] Assignee: Victaulic Company of America, Easton, Pa.

[21] Appl. No.: 644,022

[22] Filed: Jan. 18, 1991

[51] Int. Cl.⁵ .............................................. F16L 55/00
[52] U.S. Cl. ...................................... 285/23; 285/197; 285/420; 285/921; 285/39
[58] Field of Search ............... 285/197, 198, 199, 180, 285/373, 419, 23, 420, 921, 39

[56] References Cited

U.S. PATENT DOCUMENTS

| 887,051 | 5/1908 | Wiest | 285/197 |
| 2,783,771 | 3/1957 | Thomas | 285/197 X |
| 3,151,895 | 10/1964 | Ward | 285/197 |
| 4,052,953 | 10/1977 | Patel | 285/197 X |
| 4,123,035 | 10/1978 | Boudreau | 285/197 X |

FOREIGN PATENT DOCUMENTS

| 625461 | 8/1961 | Canada | 285/197 |
| 2063463 | 7/1971 | Fed. Rep. of Germany | 285/197 |
| 1309805 | 3/1973 | United Kingdom | 285/197 |

Primary Examiner—Dave W. Arola
Attorney, Agent, or Firm—Abelman Frayne & Schwab

[57] ABSTRACT

A quick connect branch connector includes a saddle to which one end of a spring clip is hingedly connected, a traction device being provided at the opposite end of the spring clip for cooperation with the saddle, whereby the spring clip can be placed under tensile hoop stress in encircling relation with a pipe.

9 Claims, 5 Drawing Sheets

QUICK CONNECT BRANCH CONNECTOR

This invention relates to a quick connect branch connector for use in plumbing systems. While not limited thereto, the invention relates to a quick connect branch connector of particular utility in assembling a fire extinguishing sprinkler system. While of particular utility in that application, the quick connect branch connector of the invention finds utility in any other application in which it is desired to connect a plumbing branch to a main pipe line.

BACKGROUND OF THE ART

Branch connections as commonly known are provided by a plumbing tee and by threading pipes into the branches of the tee.

Also known in the art are branch connectors that can be secured to a main plumbing line by straps or other fittings, and which communicate with the main plumbing line through a hole drilled through the exterior surface of the main pipe line, the branch connector being sealed to the outer surface of the main line.

Such branch connectors have been successfully employed in the fabrication of fire extinguishing sprinkler systems. However, the known branch connectors are encumbered with the disadvantage that two hands must be employed for assembling the branch connector onto the main pipe, this involving the holding of the branch connector in one hand while the securing strap is attached to the branch connector. While this poses no particular problem in locations that are readily accessible, it does pose considerable problems in the assembly of such branch connectors in difficult locations, such as high above a workshop floor, which is a typical location of such sprinkler heads.

Branch connectors that are a snap-fit onto the main pipeline have been previously proposed. Typical of such snap-on branch connectors are ones manufactured by Spraying Systems Co. of Wheaton, Ill., U.S.A. and by Uni-Spray of Waterloo, Ontario, Canada.

The snap-fit branch connectors manufactured by those firms are employed for the securement of spray nozzles to a low pressure pipeline. While the snap-fit branch connectors referred to are eminently suited to their intended purpose, which is one in which relatively low pressures exist in the pipeline, they are not suited to their employment in fire extinguishing systems.

In a fire extinguishing system, the sprinkler heads are exposed to a continuous high static pressure within the pipeline, which exists at all times and possibly for many years, and until such time that the sprinkler heads are actuated by a fire condition.

The prior known quick connect branch connectors each employ spring clips that can be snapped over the main pipeline, and, which maintain the quick connect branch connector attached to the main pipeline exclusively by the stored spring force in the spring clips.

As will be apparent, the pressure at which the connection will fail is determined by the spring force that can be exerted on the connectors by the spring clips. Thus, the use of such known quick connect branch connectors is limited to relatively low pressure applications for supporting spray nozzles that are exposed to dynamic pressure loading. In a fire extinguishing system the sprinkler heads are continuously exposed to a high static pressure loading of a much greater magnitude than that encountered in a spraying system.

Further considerations present themselves in the assembly of fire extinguishing sprinkler systems. A major one of those considerations is that the sprinkler heads must be attached to the main pipeline in a manner that prohibits accidental or intentional removal of the sprinkler head at the time the main pipeline is under pressure. This consideration, of course, applies in all other plumbing applications in which the pipeline is under pressure, particularly in the event that noxious or hazardous fluids are being conveyed by the pipeline.

Object of the Invention

The object of this invention is to provide a quick connect branch connector for use in any plumbing application, and in particular for use in the construction of fire extinguishing systems, in which the branch connector is capable of withstanding high static pressures without failing, and is incapable of accidental and unintentional release from the pipeline with which it is associated. Another object of this invention is to preserve the advantages of known quick connect branch connectors in their ability for them to be snap-fitted onto the main pipeline in a maneuver that easily can be effected by a single hand, even in difficult locations. The branch connector can then be permanently affixed to the associated pipeline, any attempts at removal of the connector then requiring the premeditated use of an appropriate tool.

Summary of the Invention

According to the present invention, a quick connect branch connector is provided by a saddle for attachment to an associated pipeline, the saddle incorporating a nipple for penetration into the associated pipeline through a hole formed therein, the nipple being surrounded by a sealing gasket.

The saddle is provided with a spring clip that is hingedly connected to the saddle and which is configured for it to snap over and closely embrace the associated pipeline in order to maintain the saddle initially attached to the associated pipeline.

The end of the spring clip remote from the hinged interconnection with the saddle is then permanently secured to that side of the saddle opposite to the hinged connection in a manner that requires a tool in order to effect the securement. As a consequence, the use of a similar or identical tool is required in order to effect the release of the branch connector from the associated pipeline, thus prohibiting accidental and unintentional release of the branch connector.

The securement of both ends of the spring clip to the saddle acts to draw the spring clips into clamping engagement with the associated pipe, thus providing a permanent interconnection between the pipe and the branch connector that relies on the tensional stress produced in the spring clip, and which does not in any way rely on the compressive spring strength thereof.

In this manner, a positive and permanent interconnection can be made between the branch connector and the associated pipe, with the advantages of initially securing the branch connector to the associated pipe in an entirely stable manner, thus freeing both of the hands of the installer for effecting the subsequent final connection of the branch connector to the associated pipe.

Conveniently, the main supply pipe is pre-drilled prior to its installation in the sprinkler system, subsequent to which the quick connect connectors can be permanently affixed to the main supply pipe.

Preferably, but not essentially, sprinkler heads are formed integrally with the branch connectors, or, are preassembled onto the branch connectors prior to their installation on the main supply pipe, thus eliminating the skill and dexterity required in installing the sprinkler heads in difficult locations, such as in elevated or cramped conditions.

DESCRIPTION OF THE DRAWINGS

The invention will now be described with reference to the accompanying drawings, which illustrate preferred embodiments of the invention, and in which.

DESCRIPTION OF THE PREFERRED EMBODIMENT

Figure 1:
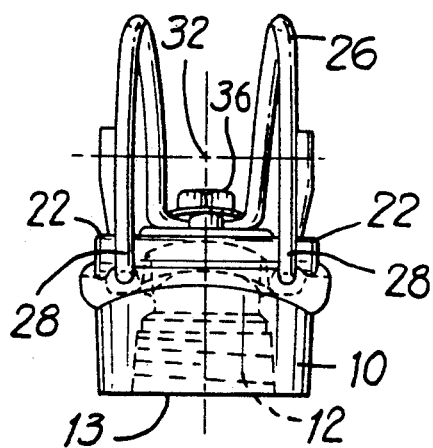
FIG. 1 is a front elevation of one embodiment of the quick connect branch connector of the invention.

Referring firstly to FIG. 1, the quick connect branch connector of the present invention includes a saddle 10 having a central through bore 12 that extends from the lower face 13 of the connector to the upper face thereof where it emerges at 14 between a pair of arcuate lugs 16 that are adapted to be received within a lateral bore formed in a pipe (not shown).

Figure 2:
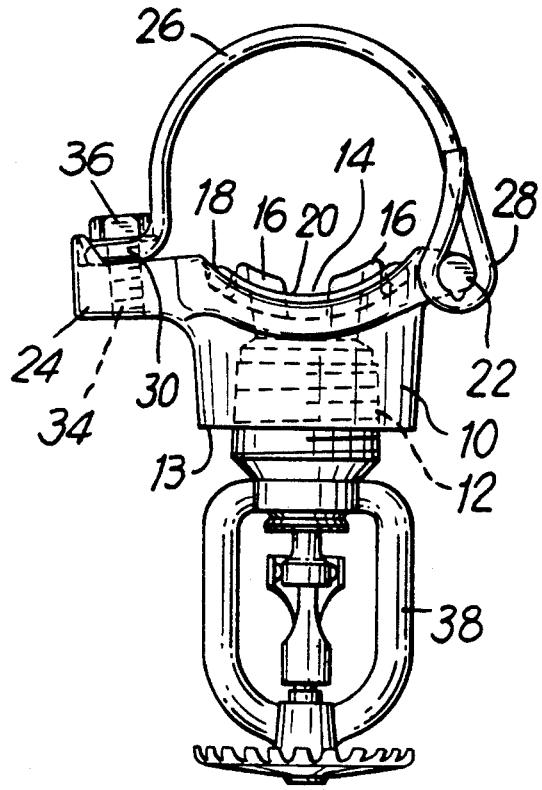
FIG. 2 is a side elevation thereof, the quick connect branch connector being shown assembled with a conventional sprinkler head.

The upper surface 18 of the saddle is configured for it to embrace the outer surface of the pipe, the upper surface being recessed for it to receive a sealing gasket 20 for engagement with the pipe periphery to provide a fluid tight seal between the saddle upper surface and the exterior of the pipe. As is shown in FIGS. 2 and 3, the upper portion of the saddle extends laterally to both sides thereof in order to provide a hinge post 22 on one side thereof and a bolting pad 24 on the opposite side.

A spring clip 26 is pivotally mounted on the hinge posts 22 by means of loops 28, the spring clip being generally of U-shape when viewed in plan, the respective arms of the spring clip merging into an eyelet portion 30. The spring clip 26 is formed of one continuous length of stiff but resilient wire that provides for gripping engagement over a pipe.

Figure 3:
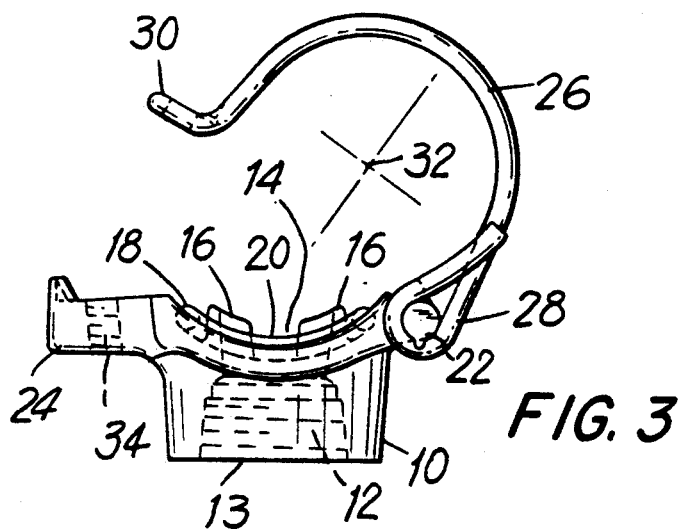
FIG. 3 is a side elevation of the quick connect branch connector shown in an opened position, preparatory to its being snapped over a conventional pipe.

As will be observed more particularly in FIG. 3, the spring clip 26 is of greater arcuate extent than one half of the periphery of the pipe, whose axis is indicated at 32, in order that the spring clip must be forced over the pipe and clipped thereon, the spring clip at that time providing a hanger for the saddle 10. The saddle can then be released by the workman in preparation for the step of assembly, the saddle at that time remaining suspended from the pipe by means of the spring clip 26.

The workman is then free to use both hands in order to rotate the spring clip around the pipe axis to bring the lugs 16 of the saddle into proper alignment with the hole bored in the pipe, subsequent to which the saddle can be rotated upwardly about the hinge post 22, to bring the lugs 16 into engagement within the hole formed in the pipe. Once the lugs are engaged within the hole in the pipe, then, further movement of the saddle 10 is precluded, in that it is held against rotation around the pipe by the engagement of the lugs 16 within the hole.

The spring clip 26 and saddle 10 are then moved to position the eyelet 30 and the bolt hole 34 in alignment. A bolt 36 is then inserted through the eyelet 30 and is threaded into the bolt hole 34, at which time the bolt can be finger tightened until the head of the bolt tightens down on the eyelet 30. The bolt can then be tightened down fully by the use of a wrench in order to bring the sealing gasket 20 into intimate sealing contact with the pipe exterior, and, to tension the spring clip 26 about the pipe periphery, thus placing the spring clip 26 under a tensile hoop stress, that is translated into a compressive seating engagement of the saddle 10 on the pipe periphery and final compression of the sealing gasket 20.

In this condition of assembly, removal of the branch connector from the pipe cannot occur accidentally or unintentionally. Removal of the branch connector from the pipe only can be accomplished by the use of a wrench employed to loosen and remove the bolt 36.

Thus, all of the advantages of the known quick connectors are accomplished, and, in addition, all of the disadvantages of the known connectors are eliminated, it being impossible to dislodge the branch connector from the pipe without having first intentionally removed the bolt.

The quick connect branch connector of the present invention, when in a fully asssssembled condition does not rely on the compressive spring strength of the spring clip 26 to hold it in position and provide the required seating pressure for the sealing gasket. The spring clip 26, when placed under a tensile hoop stress by the bolt 36, ceases to function in the capacity of a spring clip, and instead, functions in the capacity of a rigid tie strap.

In FIG. 2 of the drawings the quick connect branch connector of the invention is shown in combination with a conventional sprinkler head 38.

Conveniently, the sprinkler head 38 can be fully assembled onto the saddle 10 prior to the branch connector being applied and secured to the pipe. This eliminates assembly of the sprinkler head 38 onto the saddle 10 after it has been applied to the pipe, the location of the saddle 10 at that time possibly being a most inconvenient one in which to effect an assembly operation.

While the quick connect branch connector of the invention has been shown in association with a sprinkler head, it will be fully understood that any other fitting could be used in association with the branch connector, for example, a spray nozzle, a pressure release valve, a pressure indicating gauge, a faucet, or, a branch line of piping.

Conveniently the saddle 10 is formed as a one-piece casting of ductile iron. For other applications it can be formed form brass or copper, or, as a molding of reinforced plastics material, depending upon the application to which it is to be subjected.

While the hinged posts 22 have been shown as being cast integrally with the saddle 10, they could be provided by a rod inserted into a bore in the saddle.

Figure 4:
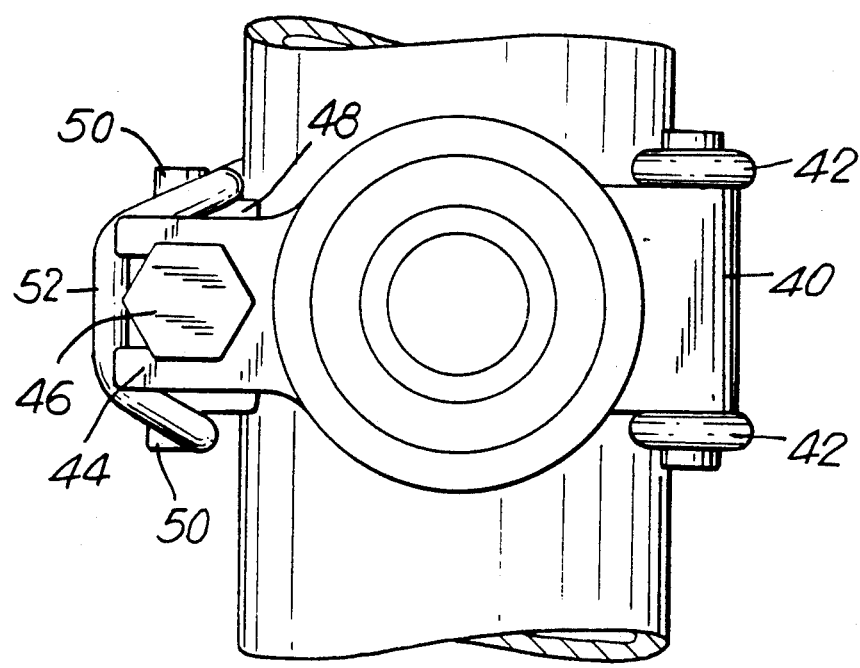
FIG. 4 is an underside plan view of another embodiment of quick connect branch connector of the invention.
Figure 5:
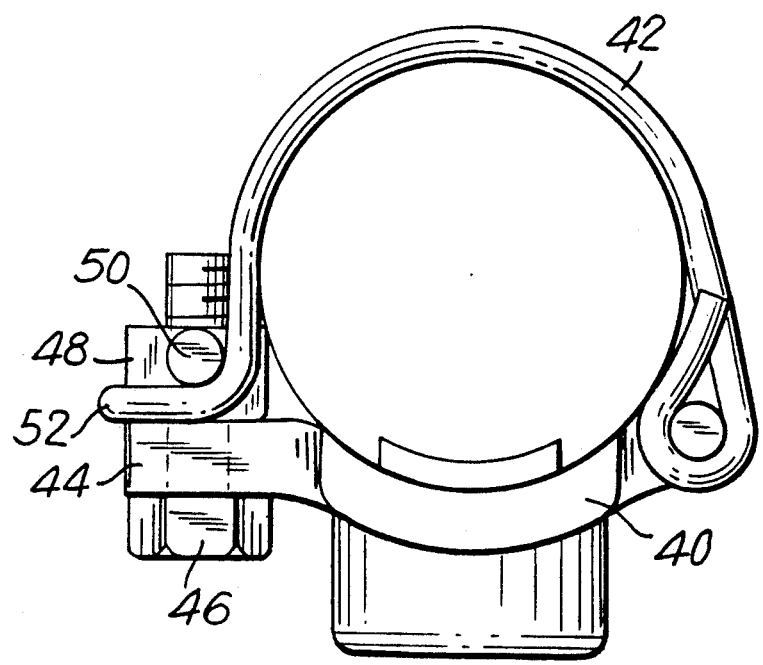
FIG. 5 is a side elevation of the branch connector of FIG. 4.

Referring now to FIGS. 4 and 5, the saddle is indicated at 40 and the spring clip at 42. The saddle and the spring clip are similar to those employed in the embodiment of FIGS. 1, 2, 3, the manner of securement of the spring clip 42 being somewhat different. Instead of providing a threaded bore, such as the threaded bore 34 in FIGS. 2 and 3, the saddle is provided with a bifurcated lug 44 having a slot dimensioned to receive the shank of a bolt 46. The shank of the bolt 46 passes through a nut 48 having laterally extending posts 50 that extend over a looped portion 52 of the spring clip.

In this manner, the nut 48 and the bolt 46 can be preassembled to the spring clip 42, which holds the nut and bolt captive, while allowing the nut and the bolt to swing about the axis of the posts 50. This permits the spring clip 42 to be snapped over the pipe periphery, the nut and the bolt then swung outwardly about the axis of the posts 50, and, the saddle 40 then swung upwardly and the bolt 46 passed into the bifurcated lug 44. This maneuver also can be performed using a single hand. The nut 46 is then tightened down using a wrench in order to draw the spring clip 42 into clamping engagement with the pipe, further tightening down of the bolt resulting in the spring clip 42 being placed under a tensile hoop stress, and in this manner providing a permanent securement of the branch connector to the pipe that only be released by the use of a wrench in a premeditated manner.

Figure 6:
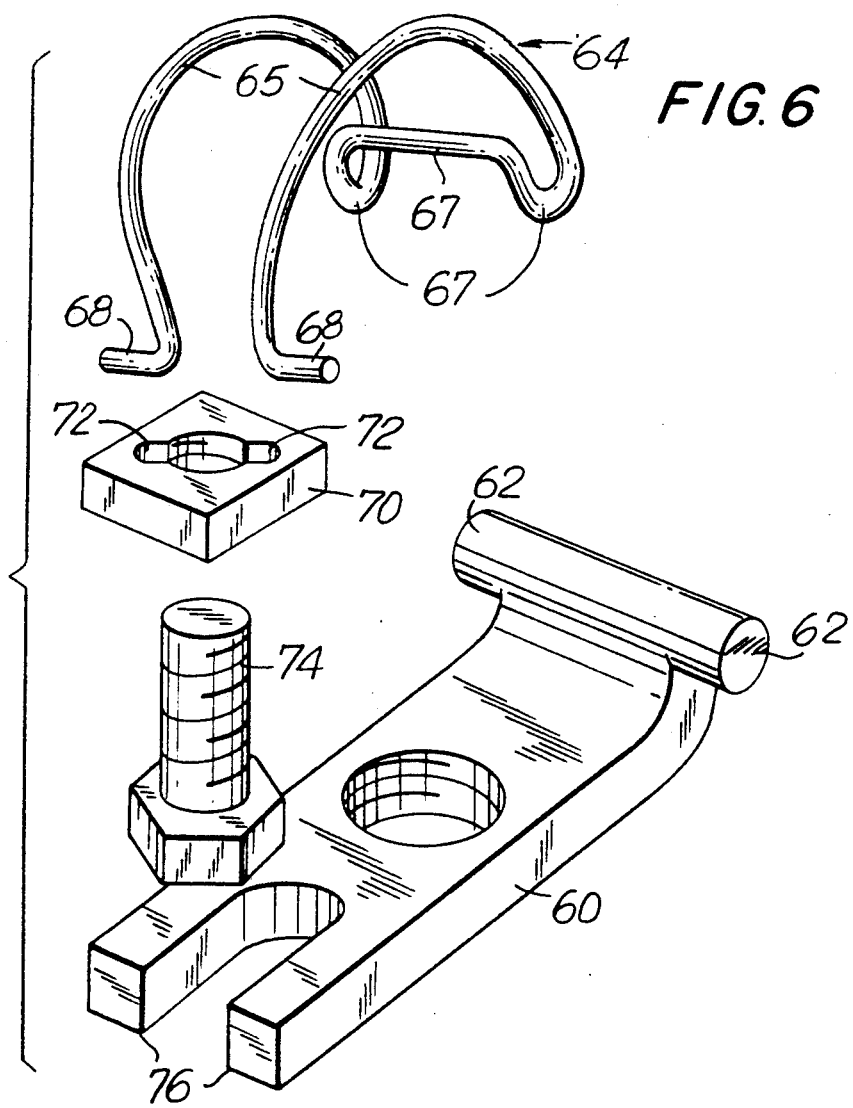
FIG. 6 is an exploded perspective view of another embodiment of quick connect branch connector of the invention.
Figure 7:
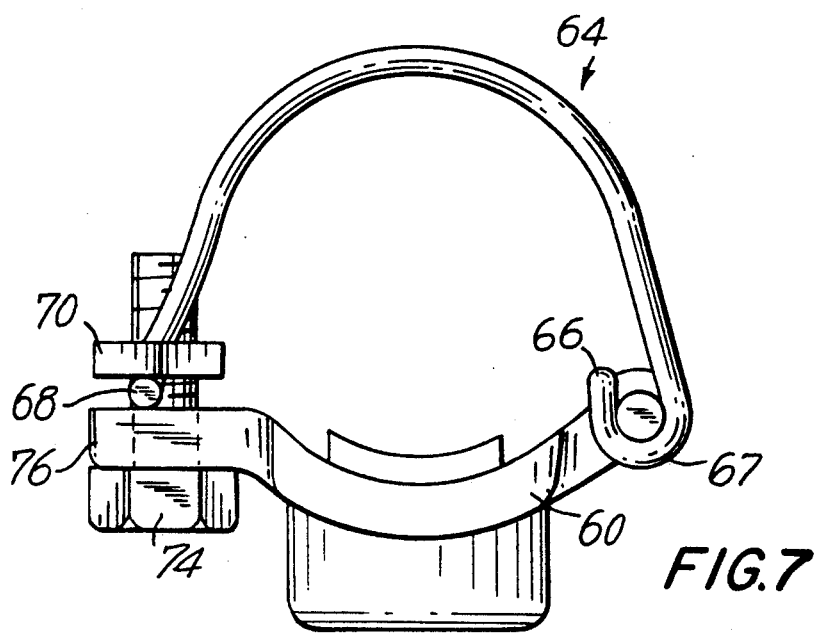
FIG. 7 is a side view of the connector of FIG. 6 when in an assembled condition.
Figure 8:
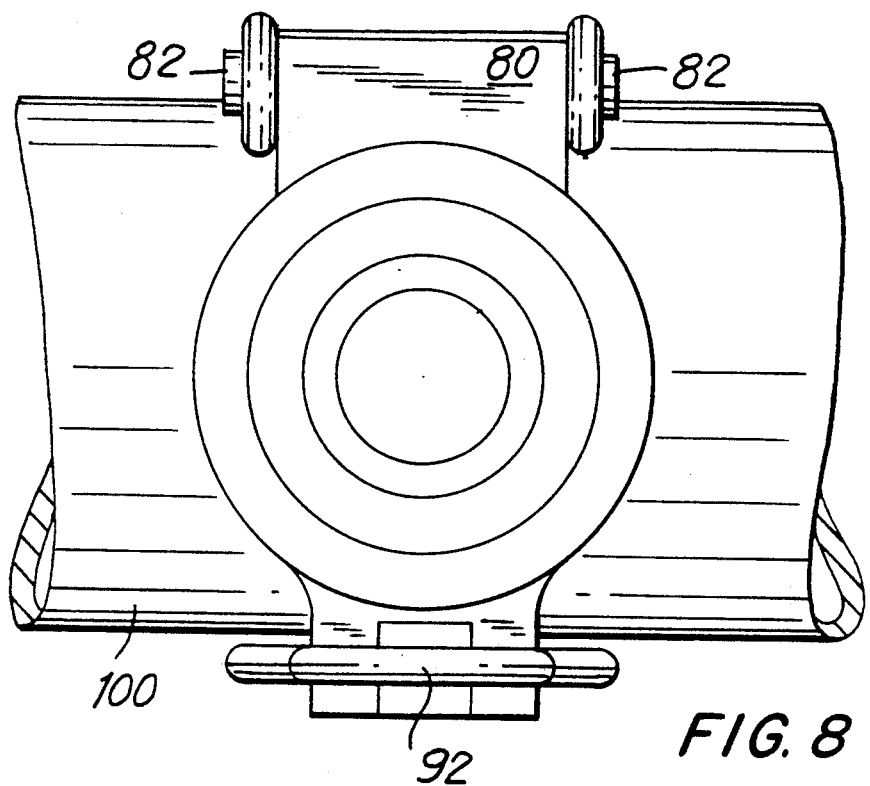
FIG. 8 is a plan view of another embodiment of quick connect branch connector of the invention.
Figure 9:
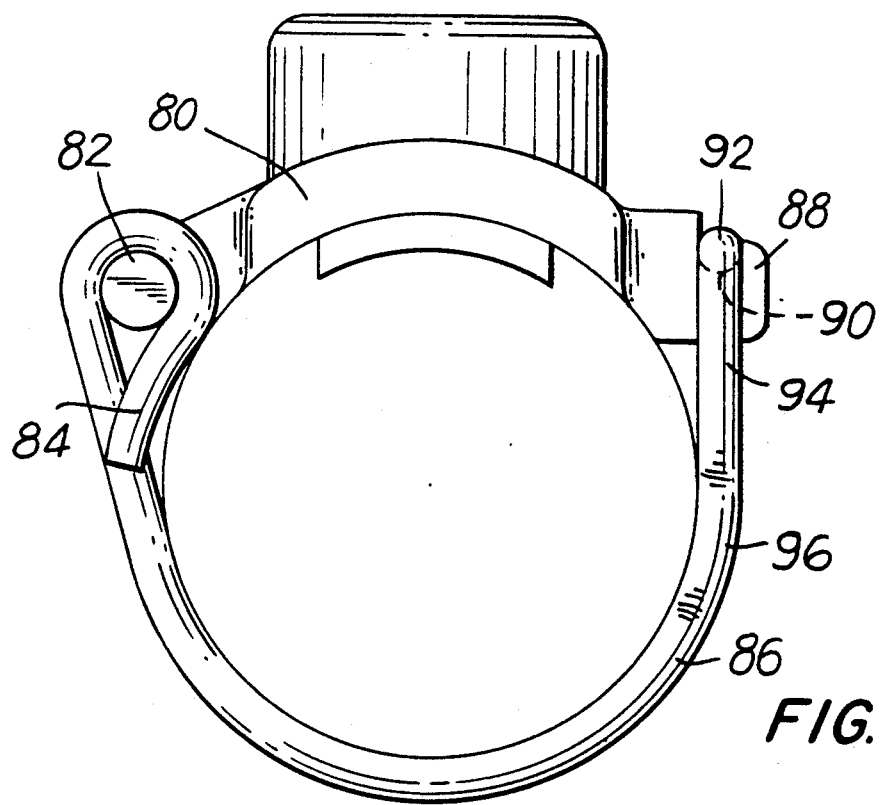
FIG. 9 is a side view of the connector of FIG. 8.
Figure 10:
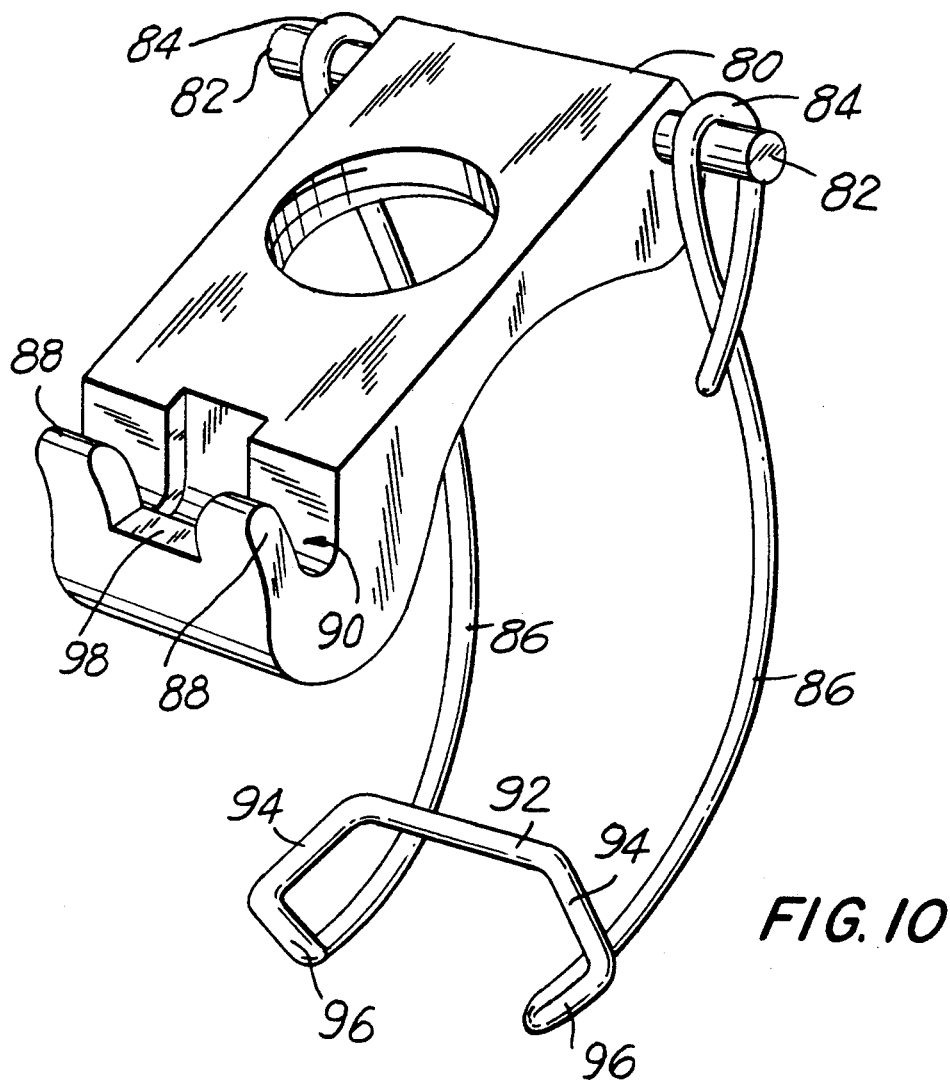
FIG. 10 is a perspective view of the connector of FIGS. 8 and 9 when in an open condition prior to assembly onto a pipe; and, FIG. 11 is a perspective view of the spring clip taken from a different position.
Figure 11:
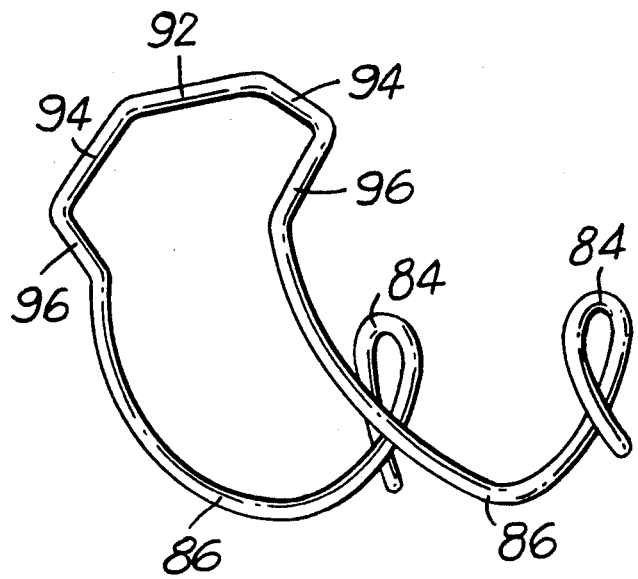

FIGS. 6 and 7 illustrate a modification of the embodiment of FIGS. 4 and 5. In this embodiment, the saddle 60 is provided with posts 62 that extend laterally of the saddle as in the embodiment of FIGS. 4 and 5.

The spring clip, indicated generally at 64, includes arcuate portions 65 that are interconnected by a laterally extending portion 66 that extends between looped portions 67 providing transitions between the portions 66 and the portions 65. The spring clip 64 is assembled onto the saddle 60 by passing the arcuate portions 65 downwardly on opposite sides of the saddle and then rotating the spring clip 64 to bring the longitudinally extending portion 66 into overlying relation with the upper surface of the saddle, at which point the spring clip member 64 becomes captive on the saddle but swingable about the axis of the posts 62.

The free ends 68 of the spring clip 64 extend outwardly and generally parallel to the longitudinally extending portion 66. The ends 68 are then moved towards each other and passed through the bore of a nut 70 having axially extending channels 72 formed therein at diametrically opposite positions. The ends 68 are then allowed to spring outwardly for them to become captive under the lower surface of the nut 70, subsequent to which a bolt 74 is threaded into the bore of the nut, in this manner preventing removal of the ends of the spring clip. The bolt 74 is then swung into a bifurcated lug 76 in the saddle 60 and the bolt tightened down to place the spring clip under tension and in clamping engagement with the exterior of the pipe.

FIGS. 8-11 illustrate another embodiment of the invention in which the required tensile hoop stress in the spring clip is produced by means other than a bolt.

In this embodiment the saddle 80 is similarly formed with posts 82 providing hinged connections for the ends 84 of a spring clip 86.

At its opposite lateral side, the saddle 80 is formed with camming lugs 88 that define a channel 90 for the reception of a transversely extending portion 92 of the spring clip 86.

At each of its axial ends, the intermediate portion 92 is formed as a V-shaped spring member having arms 94 and 96 that are capable of producing a considerable tensile stress in the spring clip 86 upon assembly of the connector.

Assembly of the connector onto a pipe is effected by swinging the spring clip upwardly to position the intermediate portion 92 in front of the camming lugs 88, subsequent to which a screwdriver or flat metal bar is inserted beneath the intermediate portion 92 and into a slot 98 provided between the camming lugs 88. The screwdriver is then employed to lever the intermediate portion 92 upwardly and over the camming lugs 88, at which time the intermediate portion 92 snaps into the channel 90 under the influence of the spring force exerted by the spring arms 94 and 96. In accomplishing this operation, the spring arms 94 and 96 will be moved to a somewhat straightened position in which they provide a considerable spring force which acts both to maintain the intermediate portion 92 clamped within the channel 90, and also, to place the arcuate portions 86 of the spring clip under very considerable tensile hoop stress acting to clamp the spring clip and the saddle directly onto the outer surface of the associated pipe, shown at 100 in FIG. 8.

In all instances the spring clip members 26, 42, 64 and 86 are formed from a high-strength rod or thick wire of a spring steel material of considerable tensile strength, thus enabling the spring clip members to perform the dual function of a spring clip that initially clips the branch connector onto the pipe prior to securement of the branch connector to the pipe, and which then, upon securement of the spring clip to the opposite end of the saddle acts as a clamping member capable of accommodating considerable tensile hoop stress in order to effect a permanent securement of the branch connector to the pipe.

In all instances a tool must be employed in order to detach the branch connector from the pipe, thus eliminating the possibility of accidental and unintentional detachment of the branch connector from the pipe.

I claim:

1. A quick connect branch connector for attachment to a fixed pipe including:

a saddle member, said saddle member having lateral sides and having an arcuate surface located between said lateral sides for engagement with an outer surface of a pipe defined by a cylindrical outer wall, said saddle having a nipple adapted to extend through a hole formed in said wall of said pipe;

a sealing gasket encircling said nipple and for sealing engagement with said outer surface of said pipe;

hinge means at one of said lateral sides of said saddle;

a securement member at an opposite lateral side of said saddle;

a spring clip member hingedly connected to said hinge means at one end of said spring clip member, said spring clip member being arcuate about an axis extending parallel to a longitudinal axis of said hinge means, and being of a diameter less than the outer diameter of said pipe; traction means at an opposite arcuate end of said spring clip member cooperable with said securement member and operative to place said clip member under tensile hoop stress loading when said spring clip member and saddle are placed in encircling relation with a pipe of an appropriate external diameter; said arcuate spring clip member having an arcuate length greater than the length of one half of the outer circumference of an associated said pipe, whereby said clip is a snap fit over the outer surface of said pipe and initially provides a support for said saddle prior to the final assembly of said quick connect branch connector onto said pipe.

2. The quick connect branch connector of claim 1, in which said spring clip member and said arcuate surface of said saddle, in combination, are of less arcuate length than the circumferential length of an associated said pipe, whereby said spring clip member is placed under a tensile hoop stress by said traction means in an assembled condition of said quick connect branch connector.

3. The quick connect branch connector of claim 1, in which said hinge means is comprised of oppositely extending posts formed integrally with said saddle member at said one lateral side of said saddle.

4. The quick connect branch connector of claim 3, in which said spring clip member is formed from spring wire or rod, and is of substantially U-shape form in plan view, the arms of said U-shape form encircling said posts formed integrally with said saddle member to provide said hinged interconnection, a bight of said U-shape form providing an eyelet for the reception of a securing bolt providing said traction means.

5. The quick connect branch connector of claim 1, in combination with a sprinkler head of conventional construction to provide a quick-connect sprinkler assembly for incorporation into a fire extinguishing sprinkler system.

6. The combination of claim 5, in which a said sprinkler head is pre-assembled to said saddle prior to the installation of said quick connect branch connector onto a pipeline, whereby to provide an integral sub-assembly of sprinkler head and quick connect branch connector.

7. The quick connect branch connector of claim 1, in which said traction means includes:
a nut having a threaded bore;
oppositely extending, axially aligned trunnions integral with said nut and extending on a diameter of said bore; and,
a bolt threaded into said bore and extending through said securement member; said trunnions overlying portions of said oppositely arcuate end of said spring clip member, and, a head of said bolt reacting against said securement member and being operative upon tightening down of said bolt to tension said spring saddle and said spring clip member are assembled in encircling relation with said pipe.

8. The quick connect branch connector of claim 1, in which said spring clip member is formed from spring wire or rod, and is of substantially U-shape form in plan view, a bight of said U-shape form encircling oppositely extending, axially aligned posts formed integrally with said saddle member to provide said hinged interconnection, further including:
a nut having a threaded bore;
diametrically opposite axially extending slots formed in the wall of said threaded bore in which ends of said spring clip member are positioned, said ends terminating in portions extending radially outwards said bore and which underlie a bottom face of said nut; and
a bolt threaded onto said bore and extending through said securement member, a head of said bolt reacting against said securement member and being operative upon tightening down of said bolt to tension said spring clip member when said saddle and spring clip member are assembled in encircling relation with a said pipe.

9. The quick connect branch connector of claim 1, in which said spring clip member is formed from spring wire, and is of substantially U-shaped form in plan view, the arms of said U-shape form encircling oppositely extending, axially aligned posts formed integrally with said saddle member at said one lateral side to provide said hinged interconnection, a bight of said U-shape form including spring formations operative to tension said spring clip member, and camming lugs provided on said securement member over which said bight of said spring clip member is forced during securement of said quick connect branch connector to a said pipe, and which are operative to tension said spring formations and impose a tensile hoop stress on said spring clip member.

* * * * *